(12) United States Patent
Shepherd

(10) Patent No.: US 6,914,514 B2
(45) Date of Patent: Jul. 5, 2005

(54) SWITCH FOR WATER BOILING APPLIANCE SUCH AS A KETTLE

(75) Inventor: Martin J. Shepherd, Causeway Bay (HK)

(73) Assignee: Kettle Solutions Limited, Causeway Bay (HK)

( * ) Notice: Subject to any disclaimer, the term of this patent is extended or adjusted under 35 U.S.C. 154(b) by 0 days.

(21) Appl. No.: 10/857,333

(22) Filed: May 28, 2004

(65) Prior Publication Data

US 2004/0217843 A1 Nov. 4, 2004

Related U.S. Application Data

(63) Continuation of application No. 10/290,580, filed on Nov. 8, 2002, now abandoned.

(30) Foreign Application Priority Data

Nov. 16, 2001 (GB) .............................................. 0127563

(51) Int. Cl.⁷ ......................... H01H 37/52; H01H 37/04
(52) U.S. Cl. ....................... 337/380; 337/381; 337/333; 337/354; 219/241; 219/510; 219/494
(58) Field of Search ................................ 337/333, 342, 337/343, 354, 380, 381; 219/240–242, 385–388, 429, 435, 438, 441, 469, 471, 490, 494, 481, 507, 510

(56) References Cited

U.S. PATENT DOCUMENTS

| 3,665,841 | A | * | 5/1972 | Hardy et al. ................... 99/281 |
| 3,725,643 | A | * | 4/1973 | Clausse ....................... 219/441 |
| 3,781,521 | A | * | 12/1973 | Kircher ....................... 219/442 |
| 3,784,788 | A | * | 1/1974 | Fourny ........................ 219/441 |
| 4,358,666 | A | * | 11/1982 | Taylor ......................... 392/444 |
| 4,376,925 | A | * | 3/1983 | Taylor .......................... 337/36 |
| 4,539,468 | A | * | 9/1985 | Phillips et al. ............... 392/447 |
| 4,621,186 | A | * | 11/1986 | Taylor et al. ................ 392/447 |
| 4,754,122 | A | * | 6/1988 | Coppier ....................... 219/437 |
| 4,982,654 | A | * | 1/1991 | Bourgeois ................... 99/323.3 |
| 5,635,092 | A | * | 6/1997 | O'Neil ......................... 219/441 |
| 5,693,244 | A | * | 12/1997 | Pragt et al. .................. 219/441 |
| 5,793,020 | A | * | 8/1998 | O'Neill ....................... 219/441 |
| 5,794,520 | A | * | 8/1998 | Hefford ....................... 99/323.3 |
| 5,852,281 | A | * | 12/1998 | Melgaard et al. ........... 219/441 |
| 6,172,341 | B1 | * | 1/2001 | Hoffmann et al. .......... 219/441 |

FOREIGN PATENT DOCUMENTS

| DE | 81 32 008.6 | | 11/1981 | ............ H05B/1/02 |
| DE | 3801583 | C | * 8/1989 | ............ A47J/27/62 |
| GB | 1 457 507 | | 12/1976 | ............ A47J/27/21 |
| GB | 1470364 | A | * 4/1977 | ............ A47J/27/21 |
| GB | 2 097 920 | A | 5/1982 | ............ G01K/5/62 |
| GB | 2 117 568 | A | 3/1983 | ............ A47J/27/21 |
| GB | 2 170 956 | A | 1/1986 | ............ A47J/27/21 |
| GB | 2 213 646 | A | 1/1989 | ............ G05D/23/10 |
| GB | 2213646 | A | * 8/1989 | ............ A47J/27/21 |
| GB | 2 221 795 | A | 8/1989 | .......... H01H/37/54 |
| GB | 2252875 | A | * 8/1992 | ............ A47J/27/21 |
| GB | 2 331 848 | A | 5/1998 | ............ H01H/1/26 |

* cited by examiner

Primary Examiner—Anatoly Vortman
(74) Attorney, Agent, or Firm—Baker Botts L.L.P.

(57) ABSTRACT

A steam-responsive switch for use in an electrical water boiling appliance comprises a main body (12) from which extends a tubular portion (13) having at or near its leading end a heat responsive bimetal (16) extending across the mouth thereof which changes shape above a predetermined temperature defining a chamber behind the member and at the opposite face of the main body (12) an electrical contact pair, the bimetal (16) engaging on its rear face a slidable pushrod (20) which extends through the main body (12) in a sealed manner to act on the electrical contact pair, the tubular portion having a steam/air vent (64) at one side thereof adjacent the rear face of the bimetal (16).

43 Claims, 6 Drawing Sheets

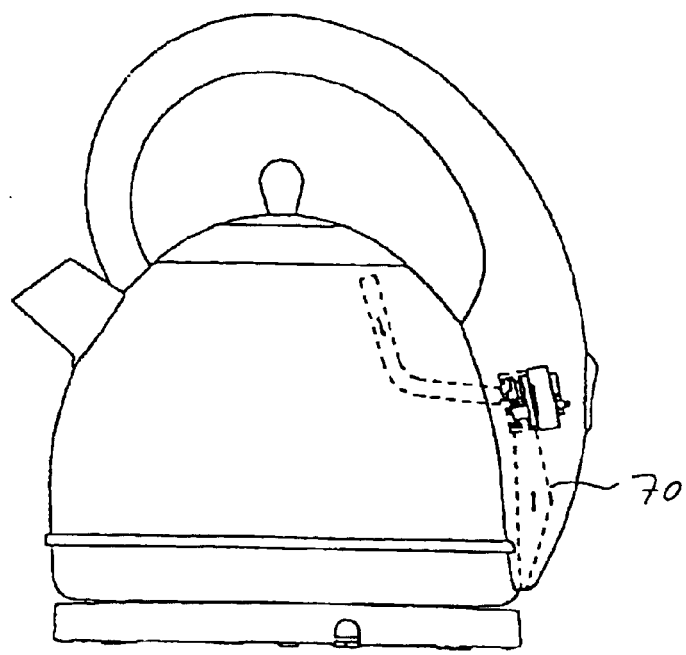
Fig.8(a)
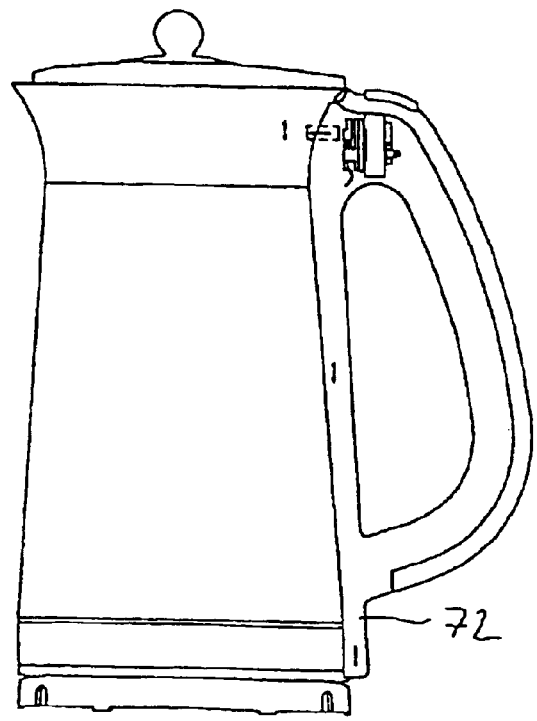
(b)

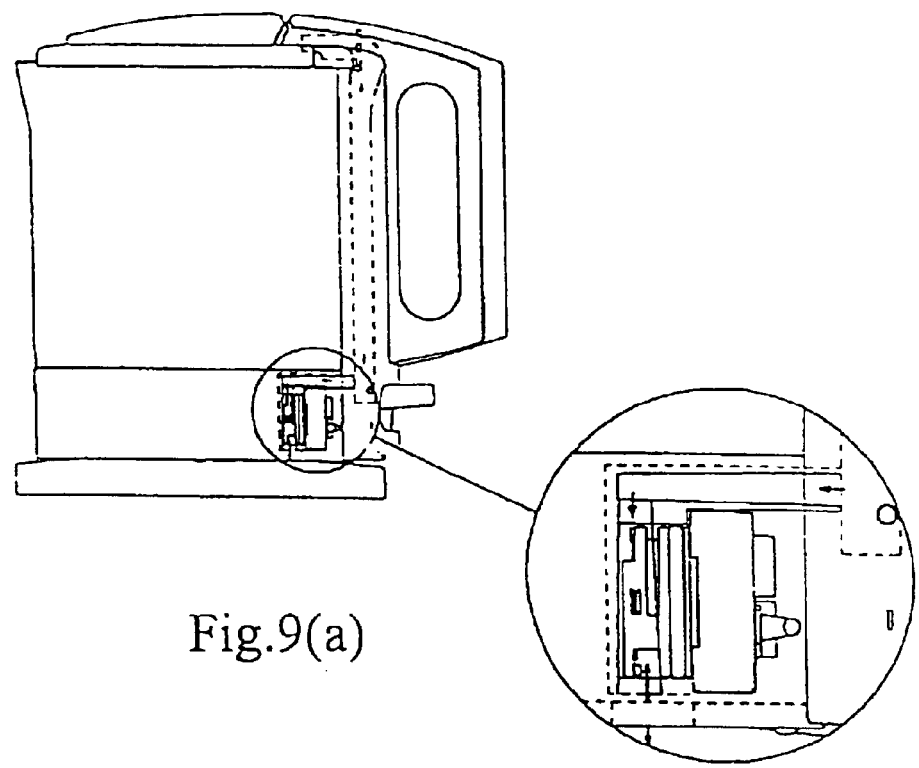
Fig.9(a)
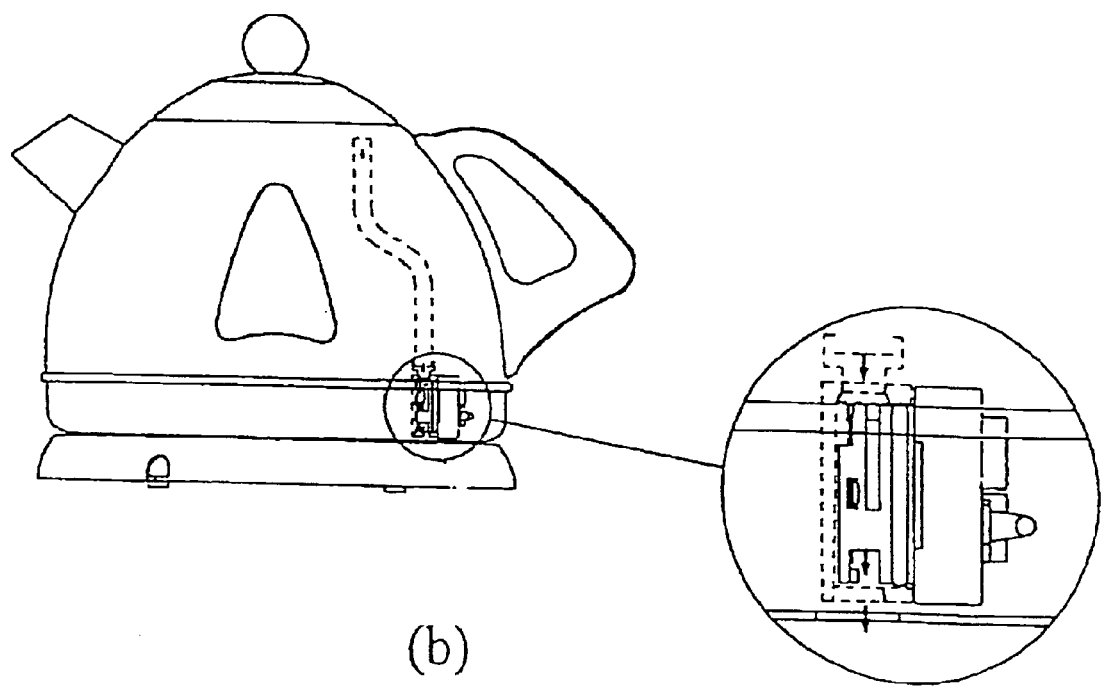
(b)

SWITCH FOR WATER BOILING APPLIANCE SUCH AS A KETTLE

This application is a continuation of U.S. application Ser. No. 10/290,580, filed Nov. 8, 2002 now abandoned.

BACKGROUND OF THE INVENTION

The present invention relates to a control for use in electrical water boiling appliances and in particular for electric kettles and jugs.

Electric kettles require a control to allow a user to heat water to a predetermined temperature, usually to boiling, at which point the kettle automatically switches off. A wide variety of controls exist to carry out this function, most commonly employing a heat-sensitive element such as a bimetallic or more recently a shaped memory alloy element which acts indirectly on an electric contact to break the electrical supply to the heating element.

An example of such a type of control is that of British Patent GB 1470364 of Otter Controls Ltd in which the bimetallic element is disposed above an opening receiving steam from the kettle body. The bimetallic element acts on an over-centre lever which in turn acts to break a pair of contacts connected in series with the heating element.

Commonly, such switches are integrated with additional operative parts having other functions in the kettle, such as thermal limiters that protect the kettle against switching on without water and after some structural arrangement allowing cordless connection. The present invention concerns only "stand-alone" switches which have the function of automatically switching off the kettle in response to steam, so-called automatic steam switches of the mechanical-thermal type.

In designing such a switch for a modem kettle the designer has to consider a variety of requirements the most significant from a safety point of view being the separation of electrically live parts from moisture generated inside the kettle during normal usage and during abuse such as overfilling and descaling, and the separation of electrically live parts from water spilled over the kettle exterior for example during the opening of the lid or clumsy filling under a water outlet.

It is also desirable that the switch reacts promptly to steam generation, and that the switch can be rapidly re-set even shortly after switching off, and these requirements influence the arrangement of the sensing element.

The size of the switch is also often of importance, the more compact the switch, the greater the freedom of the designer to create an aesthetically pleasing design which is not dictated by the size or shape of the functional components. However, as the size of the switch is reduced it then becomes increasingly difficult to meet the safety and operational requirements mentioned above.

With the requirements in mind, a vast array of switch designs have been proposed in recent years with varying functional and commercial success.

An example of a highly compact arrangement is given in DE 3801583 where a steam sensing actuator of memory alloy in a steam chamber acts through a lever on an over-centre trip lever which breaks an electrical contact pair.

A further arrangement is disclosed in GB 2213646 of Strix embodied in their R40 switch where the switch defines a shallow steam enclosure housing a dished bimetallic actuator which acts through a pushrod on a trip lever which in turn breaks contacts in a separate enclosure defined laterally adjacent the steam enclosure. The steam enclosure is here provided with an upper vent for the egress of steam. Although facilitate the cooling of the sensing element to allow rapid re-setting, the vent constitutes a source of dangerously hot steam with a risk of injury to a user.

The present invention is directed to providing a switch which is of improved compactness and yet which provides an excellent thermal response whilst being safe and reliable.

SUMMARY OF THE INVENTION

According to a first aspect of the invention there is provided a steam-responsive switch for use in an electrical water boiling appliance comprising a main body from which extends a tubular portion having at or near its leading end a heat responsive member extending across the mouth thereof which changes shape above a predetermined temperature defining a chamber behind the member and at the opposite face of the main body an electrical contact pair, the heat responsive member engaging on its rear face a slidable actuating member which extends through the main body in a sealed manner to act on the electrical contact pair, the tubular portion having a vent at one side thereof adjacent the rear face of the heat responsive member opening into the chamber, for the egress of steam and the ingress of cool air.

Arranging the heat responsive member across the mouth of the tubular portion, whereby steam can be readily directed straight onto its face, and the disposition of the side vent on the opposite face of the heat responsive member allows steam to pass over and through the member, and provides a structure where the member can rapidly respond to boiling. On the cessation of boiling, the vent facilitates the flow of relatively cool air in the reverse direction and through the member, reducing the time required for re-setting.

The steam-responsive switch is preferably a bimetallic element of dished shape which inverts above said predetermined temperature, and which may have a cut-out region therein which defines a tongue-shaped portion which engages said actuating member. The bimetallic element is preferably disposed so that the tongue-shaped portion extends towards said steam egress vent, and with the major part of the cut-out region lying on the side of the bimetal nearest the vent. The arrangement of the vent and cut-out region contribute to increased steam flow through the cut-out into the chamber onto the rear of the bimetallic element enhancing the thermal response.

The actuating member may comprise a pushrod which extends through an opening in said main body and wherein a resilient bellows-type seal is provided between the pushrod and the main body to prevent steam or water from entering said opening. The pushrod engages a bistable over-centre lever having an actuating portion which engages the electrical contact pair. By arranging the tongue-shaped portion of the bimetallic element so that this engages the pushrod slightly spaced from the tongue end the distance of travel is reduced (which is not problematic because the switch is generally desired to be as small as possible so the distance of movement to cause the trip the lever is reduced), but the applied force on snapping is larger, which is advantageous for compressing the bellows-type seal.

The switch main body is preferably of short generally cylindrical form, with the tubular portion of circular section. Switch sealing means, which may be an O-ring, is preferably provided extending circumferentially about the tubular portion of the switch body close to the main body portion. This ensures that a simple push-fit of the switch into a simple cylindrical opening provides steam and water-tight separation of the "wet" steam exposed side of the switch from the opposite "dry" side.

A cover part is provided to fit over the main body enclosing said electrical contacts therein and having openings to allow electrical connection to said contacts and through which a portion of said lever extends, said openings being surrounded by upstanding water-shedding collars. The cover part being of greater outer dimension than the tubular portion forms a shoulder therewith, so that the switch is of plug-like overall form.

This ensures that should water inadvertently find its water onto the "dry" side of the switch for example by severe water spillage it does not reach the switch contacts.

In a further aspect the invention provides a steam-responsive switch for a water boiling appliance comprising a forwardly-facing tubular portion of circular section having a heat responsive member arranged to extend across the forwardly-facing open mouth thereof and a rear portion supporting an electrical contact pair having a movable contact, a movable actuating member being provided which extends from the heat responsive member to the rear portion to act on the contact pair, the rear portion being of outer dimension slightly greater than the tubular portion with a shoulder therebetween whereby the switch has a plug-like shape for making a push-fit within a cylindrical opening or recess in an appliance.

In the preferred embodiment the rear portion comprises a main body portion from which protrudes said tubular portion and a cover which fits over the main body portion defining said shoulder. The main body portion supports said contact pair on a rear face thereof, the movable actuating member extending through the main body in a sealed manner to act on the contact pair.

The ability to make a simple plug fit into a cylindrical opening or recess on the kettle body is highly advantageous in that it allows a simple regular shape to be provided which is easy to design and manufacture and can be applied to various different kettle designs, and secondly the switch can be easily sealed with respect to the opening, ensuring steam and water-tight separation of the "wet" and "dry" sides of the switch.

In a further aspect the invention resides in a steam-responsive switch for use in an electrical water boiling appliance comprising a main body from which extends a tubular portion having at or near its leading end a heat responsive member extending across the mouth thereof which changes shape above a predetermined temperature defining a chamber behind the member and at the opposite face of the main body an electrical contact pair, the heat responsive member engaging a slidable actuating member which extends through the main body to act on the electrical contact pair, and a flexible bellows-type seal provided between the actuating member and the main body through which the actuating member extends.

At the region where the bellows-type seal engages the main body, the main body is provided with a circular groove into which a tubular end of the seal is received. The actuating member is a push rod having an enlarged head portion which the heat-responsive member abuts.

In a still further aspect the invention resides in an electrical water boiling appliance with a steam-responsive switch, the appliance having a main water carrying body provided with a steam port at an upper region of the body and an opening or recess defined on the body or a housing part joined thereto which communicates with the steam port, the switch having a main switch body from which extends a tubular portion fitted into said opening or recess having at or near its leading end a heat responsive member extending across the mouth thereof which changes shape above a predetermined temperature defining a chamber behind the member, with an electrical contact pair disposed at the opposite face of the main switch body, a slidable actuating member which engages the heat responsive member extending through the main switch body in a sealed manner to act on the electrical contact pair, the tubular portion having a vent at one side thereof adjacent the rear face of the heat responsive member opening into the chamber for the egress of steam and the ingress of cool air.

The switch vent is preferably disposed at the lower side of the tubular portion, with the appliance body or housing connected thereto having a passageway in communication with the vent and with the exterior to allow the rapid ingress of cool air after switch-off.

BRIEF DESCRIPTION OF THE DRAWINGS

Embodiments of the invention are illustrated, by way of example only, with reference to the following drawings in which:

FIGS. 8(a) and (b) show the switch located at two different locations in different designs of kettles; and FIGS. 9(a) and (b) show the switch in two further kettle designs.

DETAILED DESCRIPTION OF THE PREFERRED EMBODIMENTS

Figure 1:
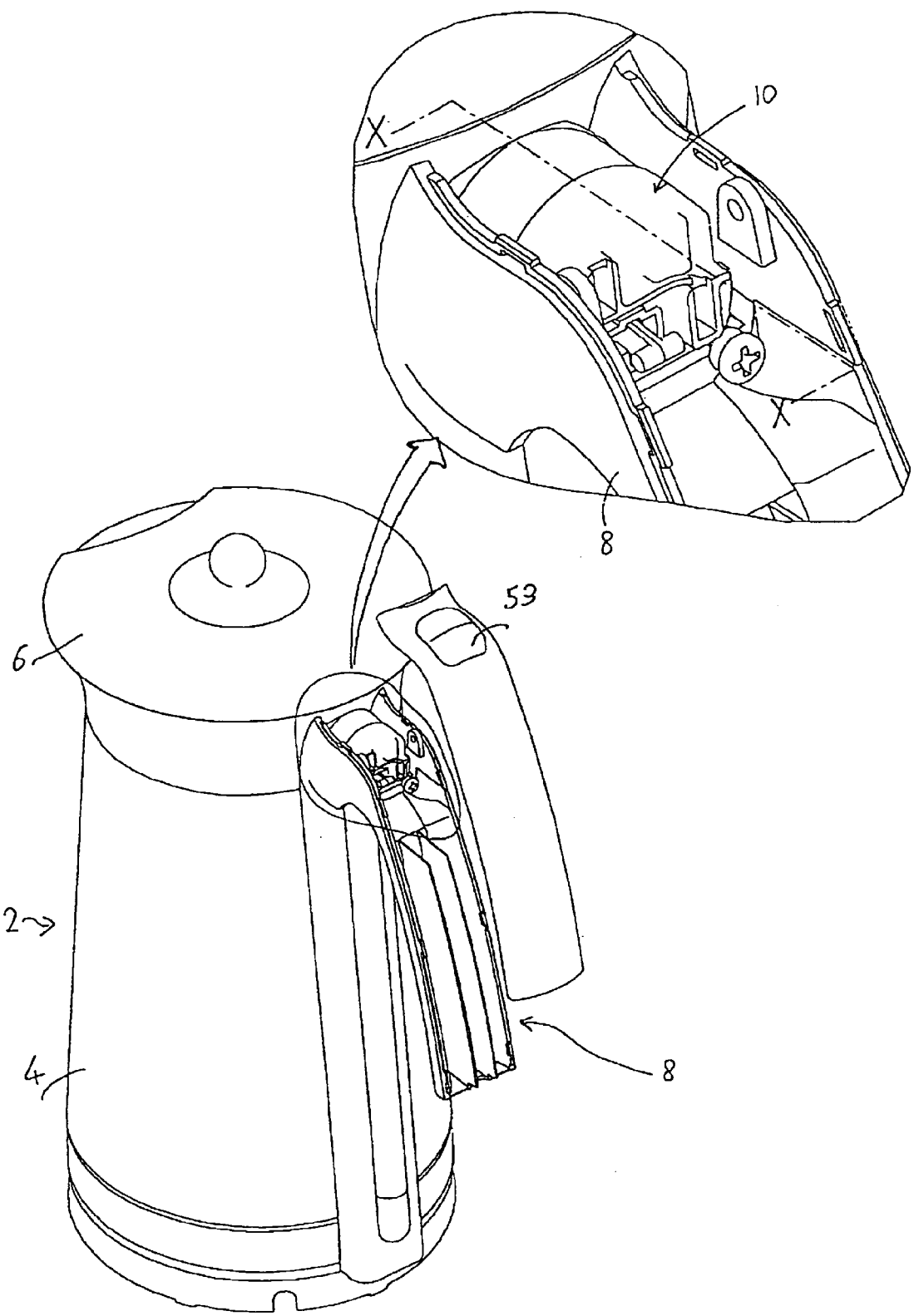
FIG. 1 shows a kettle incorporating a switch in accordance with an embodiment of the invention, the inset being an enlarged view of the switch and part of a handle.

Turning to the drawings, and first to FIG. 1, this shows a water boiling appliance, in this case being a kettle 2 but which could equally be some other kind of water boiling appliance in which a steam-sensing switch is provided. The kettle 2 has a main water-carrying body 4 which houses an electrical heating element in the base thereof and a lid 6. A handle 8 is joined to the body 4.

Disposed on the body 4 within an upper portion of the handle 8 is a steam-sensing switch 10 which serves to automatically break the electrical circuit supplying power to the heating element. As can be seen most clearly in FIGS. 3 to 6 the switch 10 is of generally cylindrical plug-like form whereby it can be fitted into a tubular or cylindrical housing or formation of circular section within the kettle as discussed in further detail below. The switch 10 has a generally shallow cup-like main body 12 having a base region on which the majority of the operative components are supported, and a forwardly-protruding tubular portion 13 defining an interior chamber, and constituting the steam-facing "wet" side of the switch. A cup-like cover 14 of slightly greater outside diameter than the main body 12 fits over the rear "dry" side of the main body 12 enclosing the operative components. At or near forwardly facing mouth of the tubular portion 13 there is disposed a bimetallic disc 16 secured at its edges on the end of the tubular portion 13 across the mouth thereof so as to be in generally a vertical orientation within the kettle and with its active face facing forwardly to the mouth of the tubular portion 13. The bimetallic disc is of conventional dished construction having central U-shaped cut-out defining a tongue 18 which in the cold condition of the switch lies in a forward position and which on reaching a predetermined switching temperature snaps to a more rearward position (to the right in FIG. 2) as the direction of dishing of the disc inverts. The bimetallic disc may be of a type which on cooling below a second lower predetermined temperature (typically 30° C. below its hot switching temperature) automatically snaps back to its original cold condition. Alternatively, it may be of type where it is necessary to manually reset in the manner discussed below.

Figure 2:
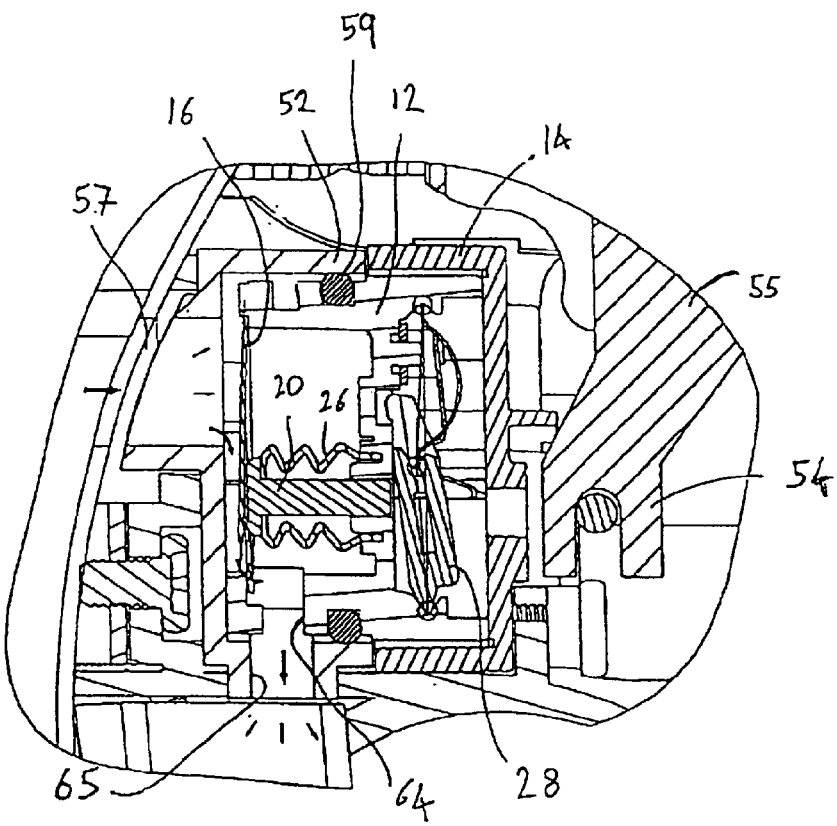
FIG. 2 is a cross-sectional view along the line x—x of the inset to FIG. 1.

The tongue 18 of the bimetallic disc 16 acts on an actuating pushrod 20 which has an enlarged head 22 and at its opposite end is slidably supported in an aperture 24 in the main switch body 12. A bellows-type seal member 26 formed of a flexible plastics material such a silicone is disposed about the pushrod 20 between its head 22 and a circular groove defined in the main body 12 about the aperture 24 in which a tubular end of the seal member 26 sits in order to prevent any water which might reach the chamber from passing through the aperture to the opposite "dry" side of the switch, which might otherwise occur along the sides of pushrod 20, for example through capillary action. The forward end of pushrod 20 engages a trip lever 28 which is mounted on the rear "dry" side of the main body 12 and pivotably supported at its lower (i.e. in the fitted orientation for example as shown in FIG. 2) end. A "C" spring 30 is arranged between an indented shoulder on the lever 28 and a downwardly facing indent on a protrusion 32 extending from the main body 12, and is in compression such that the lever constitutes a bi-stable mechanism having an ON position in which the upper end of the lever 28 lies against the main body 12, and an OFF position in which the upper end of the lever 28 is spaced from the main body. The lever 28 is formed with a finger 34 extending parallel to the axis of pivoting. The electrical components of the switch comprise a switch contact pair including a fixed contact strip 36 with a silver contact 38 and bent at one end to form a spade terminal 40 and a bent movable contact 42 having a silver contact 44 and at the opposite end a spade terminal 46. These contacts are connected electrically in series with the electrical heating element. The finger 34 of the lever 28 lies beneath the movable contact 42 such that in the ON position of the lever the contacts touch and power is supplied to the heating element. As the lever 28 trips to the OFF position in response to snapping of the bimetallic disc as it reaches the predetermined temperature, the finger 34 lifts the movable contact 42, the silver contacts 38 and 44 are separated and the electrical connection thereby broken.

As can be seen in FIG. 2, the pushrod 20 is disposed so that its head 22 is spaced from the end of the tongue of the bimetallic disc 16. This is in contrast to the conventional arrangements using such bimetallic discs where the end of the tongue is generally used in order to provide maximum travel. Here however the axis of the pushrod 20 is displaced so that the pushrod 20 can effectively act on the lever 28 at a position sufficiently displaced from its lower point, despite the very small size of the lever 28. It is found that despite the decrease in travel of the region of the tongue 18 spaced from its end, the increase in force supplied from this position is able to mitigate any problems of the pushrod movement being insufficient to drive the lever and to compress the bellows seal 26.

Figures 3, 4:
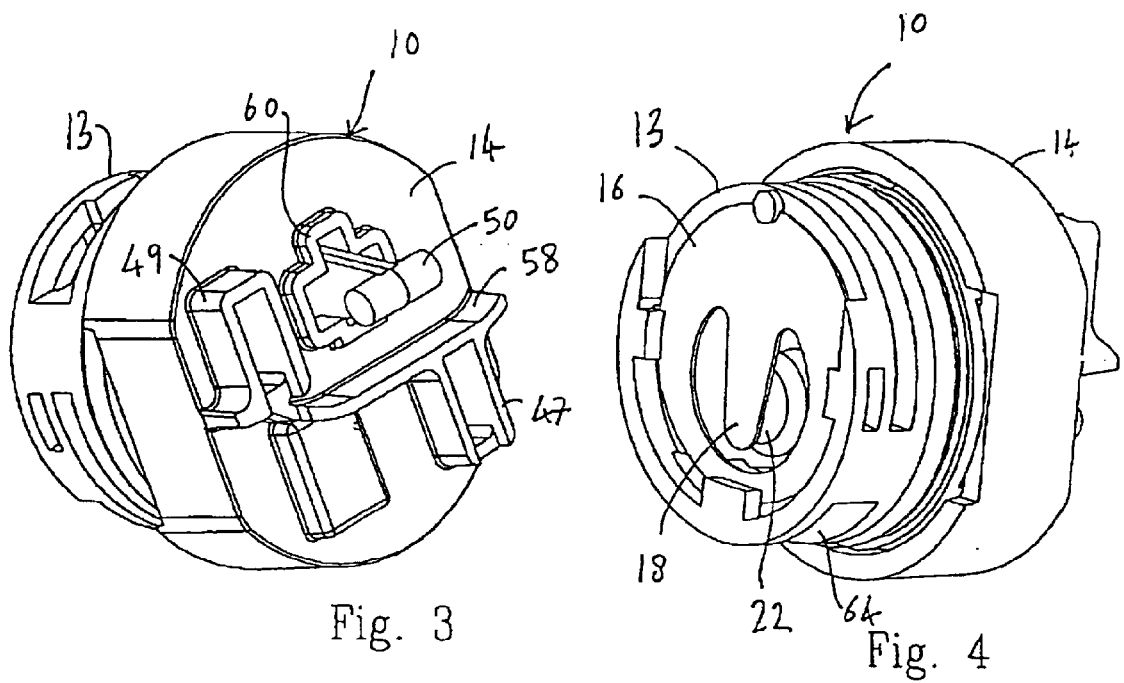
FIG. 3 is a rear perspective view of the switch.
FIG. 4 is a front perspective view of the switch.

The lever 28 is also formed with a rearwardly-extending protrusion 48 having a T-bar 50 at its end. An actuating knob 53 of the kettle for the user to control the switch is slidably mounted on the handle 8 and is connected through web 55 to a lower forked end 54 which fits over the T-bar 50 whereby the user can manually re-set the trip lever 28 to an ON condition. When assembled with the cover 14 fitted, the protrusion 48 extends through an opening in the cover 14 with the T-bar 50 outside the cover 14 as seen in FIG. 3. It will be appreciated however that a variety of alternative means could be utilised to provide a mechanical linkage between the lever 28 and an actuating knob 53.

When the switch has tripped to the OFF position following boiling and the user wishes to promptly re-set without waiting for the switch to re-cool to a temperature below the second temperature at which the bimetallic element would automatically switch to its lower temperature position, the user can re-set the switch manually using the knob 53 which acts through the lever and pushrod 20 on the bimetallic disc 16 to invert it to its cold condition. The design of the switch is arranged to facilitate such rapid re-setting as discussed later.

As can be seen in FIG. 2 the switch 10 is mounted in the mouth of a tubular or cylindrical formation 52 of circular section which is part of or joined to the kettle body with an appropriate port and/or ducting provided to direct steam from the kettle interior onto the "wet" side of the switch 10. In the illustrated embodiment a port 57 provides direct communication with the kettle interior. The tubular portion 13 of the main body makes a plug-fit within the tubular formation 52. An O-ring seal 59 seated in a recess 56 on the tubular portion 13 near the base of the main body 12 provides fluid-tight sealing between the portion 13 of the main body 12 and the formation 52 of the kettle and thereby seals the "wet" side of the switch (which as well as being subject to steam is also possibly subject to water in an overfilling or tilted condition) from the opposite "dry" side.

Figure 5:
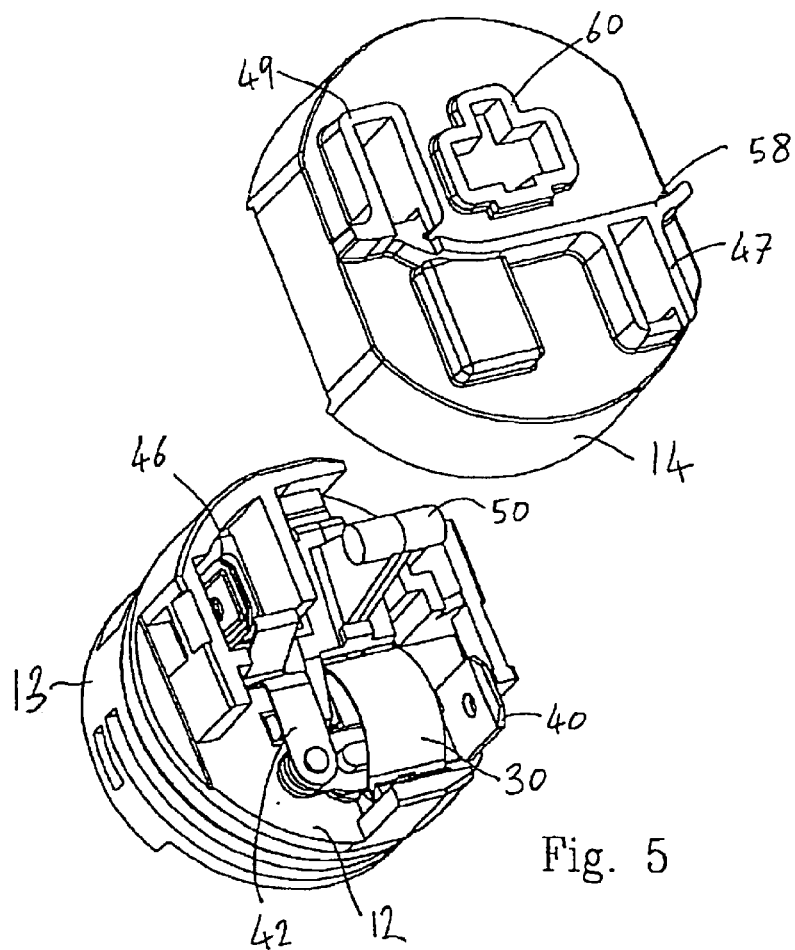
FIG. 5 is a rear perspective view of the switch with a cover removed.
Figure 6:
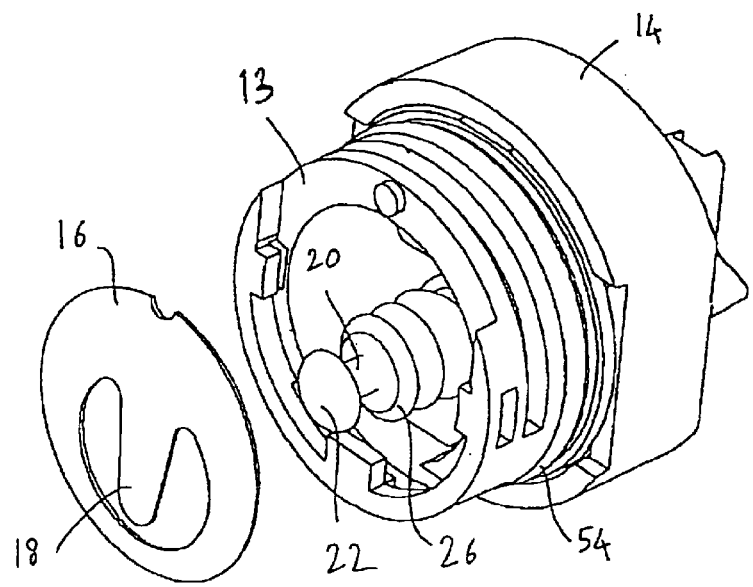
FIG. 6 is a front perspective view of the switch with a bimetal removed.
Figure 7:
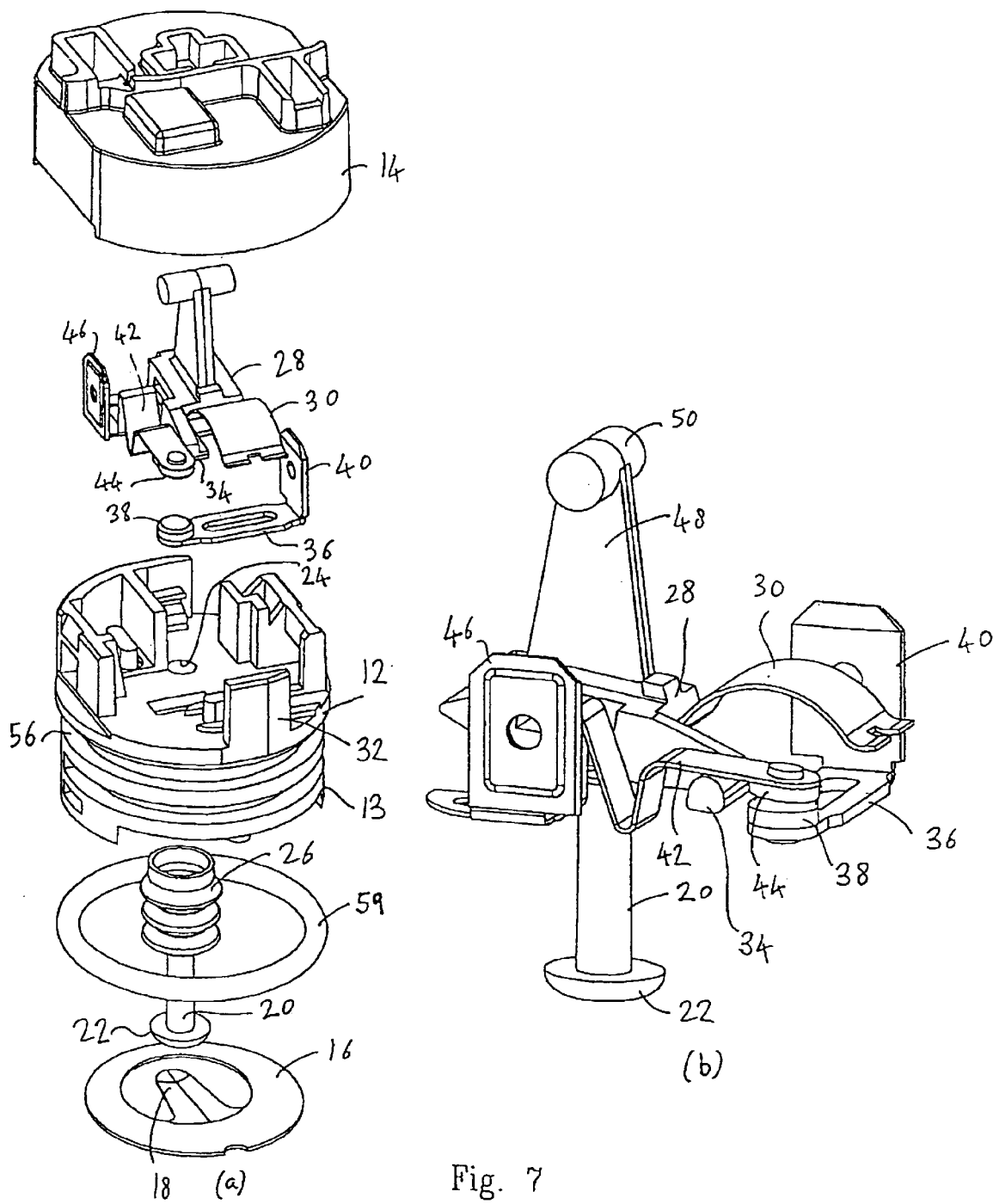
FIG. 7(a) is an exploded view of the switch.
FIG. 7(b) is a view of the main operative parts of the switch (aside from the bimetal)

As can be seen in FIGS. 3 and 5 short collar-like projections 47, 49 on the cover 14 surround openings in the cover for making connection to the spade terminals 40, 46. In addition to the projections 47, 49 the cover 14 includes a shelf 58 extending laterally across the cover 14 providing additional protection against any water which might inadvertently find its way onto the cover from above from reaching the electrical contacts. The opening for the protrusion 48 is likewise provided with a short upstanding collar or edge 60 as a further precaution against spilled water.

The forward "wet" side of the switch is provided with an opening in the wall of the tubular portion 13 which serves to enhance the cooling of the bimetallic disc 16 after switching in order to allow rapid re-setting. More specifically, the tubular portion 13 is provided with a lower part-circumferentially extending slot-like vent 64. On the boiling of water the steam reaches the mouth of the tubular portion and forward face of the bimetallic disc 16 impinging directly onto its forward face from either an axial or radial direction, depending on the kettle design. Ideally, the steam is directed onto the "heart" of the bimetallic disc 16 near the base of the tongue, which is the most active sensing region thereof. The steam passes through the U-shaped central opening into the interior chamber, and passes downwardly through the lower opening 64 and through a lower vent 65 in the formation 52.

After snapping of the bimetallic element 16 at the predetermined temperature, consequent breaking of the contacts and the cessation of boiling, the relatively hot vapour/air ceases to flow from the kettle interior. Instead, the hot air/steam in the kettle body interior rises though the kettle spout creating an updraft, and pulling hot air/steam from the switch and causing a reversed upward movement of air through the lower vent 64 (which may communicate with the exterior environment for example through a duct and opening in the lower end of the handle). Thus, cool air passes into the interior chamber and through the bimetallic disc 16 via the cut-out. In this way the speed of cooling of the bimetallic disc can be maximised, reducing the time for re-setting.

In the versions of FIGS. 9(*a*) and (*b*) the switch is mounted within the kettle base and communicates with the kettle interior via a longer steam duct which, as can be better seen in the enlarged views, open into the switch receiving recess in a direction parallel to the face of the bimetallic disc. On boiling, the steam is thereby directed laterally across the face of the bimetallic disc.

FIGS. 8(*a*) and (*b*) show two arrangements where the switch is located in a kettle communicating with the interior by appropriate ducting, and where steam impinges directly onto the bimetallic disc. In the version of FIG. 8(*a*) ducting 70 is provided to connect the lower switch vent 64 with the base of the handle, whereas in FIG. 8(*b*) the vent 64 communicates with the exterior through a hollow housing interior 72 which is open at its lower edge.

The described structure provides a switch which can be constructed of very small dimension, for example to a diameter of 27 mm, thereby allowing the designer of the aesthetic aspects of the kettle increased design freedom. The switch is moreover of rapid response, both on switching off, and allowing rapid re-setting, whilst being of very safe and still simple construction.

What is claimed is:

1. A steam-responsive switch for use in an electrical water boiling appliance comprising a main body from which extends a tubular portion having at or near its leading end a heat responsive member extending across the mouth thereof which changes shape above a predetermined temperature defining a chamber behind the member and at the opposite face of the main body an electrical contact pair, the heat responsive member engaging on its rear face a slidable actuating member which extends through the main body in a sealed manner to act on the electrical contact pair, the tubular portion having a vent at one side thereof adjacent the rear face of the heat responsive member opening laterally into the chamber facing across the heat responsive member, for the egress of steam and for the ingress of cool air.

2. A steam-responsive switch according to claim 1 wherein the heat-responsive member is a bimetallic element of dished shape which inverts above said predetermined t temperature.

3. A steam-responsive switch according claim 2 wherein the bimetallic element has a cut-out region therein which defines a tongue-shaped portion which engages said actuating member.

4. A steam-responsive switch according to claim 3 wherein the bimetallic element is disposed such that the tongue-shaped portion extends towards said steam vent.

5. A steam-responsive switch according to claim 3 wherein the actuating member engages the tongue-shaped portion at a position spaced from the tongue end.

6. A steam-responsive switch according to claim 1 wherein said actuating member comprises a pushrod which extends through an opening in said main body and wherein a resilient bellows-type seal is provided between the pushrod and the main body to prevent steam or water from entering said opening.

7. A steam-responsive switch according to claim 6 wherein the pushrod engages a bistable over-centre lever having an actuating portion which engages the electrical contact pair.

8. A steam-responsive switch according to claim 1 wherein sealing means is provided extending circumferentially about the tubular portion close to the main body portion.

9. A steam-responsive switch according to claim 8 wherein the sealing means comprises an O-ring seal.

10. A steam-responsive switch according to claim 7 wherein a cover part is provided to fit over the main body enclosing said electrical contacts therein and having openings to allow electrical connection to said contacts and through which a portion of said lever extends, said openings being surrounded by upstanding water-shedding collars.

11. A steam-responsive switch according to claim 1 wherein the main body is of short generally cylindrical form and the tubular portion is of circular section.

12. A steam-responsive switch for a water boiling appliance comprising forwardly-facing tubular portion of circular section having a heat responsive member arranged to extend laterally across the forwardly-facing open mouth thereof and a rear portion including a main body supporting an electrical contact pair having a movable contact, a chamber being defined between the heat responsive member and the main body, a movable actuating member being provided which extends from the heat responsive member to the rear portion to act on the contact pair, the rear portion being of outer dimension slightly greater than the tubular portion with a shoulder therebetween whereby the switch has a plug-like shape for making a push-fit within a cylindrical opening or recess in an appliance.

13. A steam-responsive switch according to claim 12 wherein the rear portion further comprises a cover which fits over the main body defining said shoulder.

14. A steam-responsive switch according to claim 13 wherein the main body portion supports said contact pair on a rear face thereof, the movable actuating member extending through the main body in a sealed manner to act on the contact pair.

15. A steam-responsive switch according to claim 12 wherein the tubular portion has a vent at one side thereof adjacent the rear face of the heat responsive member opening laterally into the chamber facing across the heat responsive member, for the egress of steam and the ingress of cool air.

16. A steam-responsive switch according to claim 15 wherein the heat-responsive member is a bimetallic element of dished shape which inverts above a predetermined temperature.

17. A steam-responsive switch according to claim 16 wherein the bimetallic element has a cut-out region therein which defines a tongue-shaped portion which engages said actuating member.

18. A stream-responsive switch according to claim 17 wherein the bimetallic element is disposed such that the tongue-shaped portion extends towards said vent.

19. A steam-responsive switch according to claim 17 wherein the actuating member engages the tongue-shaped portion at a position spaced from the tongue end.

20. A steam-responsive switch according to claim 12 wherein said actuating member comprises a pushrod which extends through an opening in said main body and wherein a resilient bellows-type seal is provided between the pushrod and the main body to prevent steam or water from entering said opening.

21. A steam-responsive switch according to claim 20 wherein the pushrod engages a bistable over-center lever having an actuating portion which engages the electrical contact pair.

22. A steam-responsive switch according to claim 21 wherein the cover fits over the main body enclosing said electrical contacts therein and having opening to allow electrical connection to said contacts and through which a portion of said lever extends, which openings are surrounded by upstanding water-shedding collars.

23. A steam-responsive switch according to claim 20 wherein at the region where the bellows-type seal engages the main body, the main body is provided with a circular groove into which a tubular end of the bellow-type seal is received.

24. A steam-responsive switch according to claim 20 wherein the push rod has an enlarged head portion which the heat-responsive member abuts.

25. A steam-responsive switch according to claim 12 wherein sealing means is provided extending circumferentially about the tubular portion close to the main body.

26. A steam-responsive switch according to claim 25 wherein the sealing means comprises an O-ring seal.

27. A steam-responsive switch according to claim 12 wherein the chamber is of substantial axial extent.

28. A steam-responsive switch according to claim 12 wherein the chamber is of an axial extent about one-third of the lateral dimension of the heat responsive member.

29. A steam-responsive switch for use in an electrical water boiling appliance comprising a main body from which extends a tubular portion having at or near its leading end a heat responsive member extending across the mouth thereof which changes shape above a predetermined temperature defining a chamber behind the member and at the opposite face of the main body an electrical contact pair, the heat responsive member engaging a slidable actuating member which extends through the main body to act on the electrical contact pair, and a flexible bellows-type seal provided between the actuating member and the main body through which seal the actuating member extends.

30. A steam-responsive switch according to claim 29 wherein at the region where the bellows-type seal engages the main body, the main body is provided with a circular groove into which a tubular end of the seal is received.

31. A steam-responsive switch according to claim 29 wherein the actuating member is a push rod having an enlarged head portion which the heat-responsive member abuts.

32. A steam-responsive switch according to claim 31 wherein the pushrod engages a bistable over-centre lever having an actuating portion which engages the electrical contact pair.

33. A steam-responsive switch according to claim 29 wherein the bellows-type seal is formed of a silicone.

34. A steam-responsive switch according to claim 29 wherein the chamber is of substantial axial extent.

35. A steam-responsive switch according to claim 29 wherein the chamber is of an axial extent about one-third of the lateral dimension of the heat responsive member.

36. A steam-responsive switch according to claim 29 further comprising a cover which fits over the main body defining a shoulder between the cover and tubular portion.

37. A steam-responsive switch according to claim 29 wherein sealing means is provided extending circumferentially about the tubular portion close to the main body.

38. A steam-responsive switch according to claim 37 wherein the sealing means comprises an O-ring seal.

39. A steam-responsive switch according to claim 29 wherein the tubular portion has a vent at one side thereof adjacent the rear face of the heat responsive member opening laterally into the chamber facing across the heat responsive member, for the egress of steam and the ingress of cool air.

40. A steam-responsive switch according to claim 39 wherein the heat-responsive member is a bimetallic element of dished shape which inverts above said predetermined temperature.

41. A steam-responsive switch according to claim 40 wherein the bimetallic element has a cut-out region therein which defines a tongue-shaped portion which engages said actuating member.

42. A steam-responsive switch according to claim 41 wherein the bimetallic element is disposed such that the tongue-shaped portion extends towards said vent.

43. A steam-responsive switch according to claim 41 wherein the actuating member engages the tongue-shaped portion at a position spaced from the tongue end.

* * * * *